United States Patent
Geiser et al.

(10) Patent No.: US 7,871,276 B2
(45) Date of Patent: Jan. 18, 2011

(54) ELECTRICAL CONNECTION BAR AND ADAPTED CONNECTION DEVICE

(76) Inventors: Francis Geiser, Chemin du Vounoz 10B, 1400 Yverdon (CH); Michel Braillard, Les Oches, 1376 Goumoens-La-Ville (CH); Grégory Crausaz, Les Nouvellas Gentianes, 2, rue de l'Eglise, 25160 Malbuisson (FR)

( * ) Notice: Subject to any disclaimer, the term of this patent is extended or adjusted under 35 U.S.C. 154(b) by 0 days.

(21) Appl. No.: 10/573,358

(22) PCT Filed: Sep. 24, 2004

(86) PCT No.: PCT/FR2004/002420

§ 371 (c)(1),
(2), (4) Date: Mar. 24, 2006

(87) PCT Pub. No.: WO2005/031937

PCT Pub. Date: Apr. 7, 2005

(65) Prior Publication Data

US 2007/0000903 A1      Jan. 4, 2007

(30) Foreign Application Priority Data

Sep. 24, 2003   (FR) .................................. 03 11212

(51) Int. Cl.
*H01R 25/00* (2006.01)
(52) U.S. Cl. ...................... 439/110; 439/716
(58) Field of Classification Search .................. 439/110, 439/111, 112, 114, 115, 716, 212, 213; 361/650, 361/652, 656, 648, 634
See application file for complete search history.

(56) References Cited

U.S. PATENT DOCUMENTS

| | | | |
|---|---|---|---|
| 3,546,367 A | | 12/1970 | Hart et al. |
| 3,836,936 A | * | 9/1974 | Clement ..................... 439/115 |
| 4,173,382 A | * | 11/1979 | Booty ......................... 439/117 |
| 5,645,437 A | * | 7/1997 | Meir .......................... 439/110 |
| 7,656,648 B2 | * | 2/2010 | Cant et al. .................. 361/637 |

FOREIGN PATENT DOCUMENTS

| | | |
|---|---|---|
| BE | 624 438 A | 5/1963 |
| DE | 69 28 816 U | 2/1970 |
| DE | 30 23 499 A | 1/1982 |
| DE | 195 15 358 A | 12/1995 |
| EP | 0 465 099 A1 | 1/1992 |
| FR | 2.027.501 | 10/1970 |
| FR | 2.030.503 | 11/1970 |
| FR | 2 649 550 A | 1/1991 |
| FR | 2 681 479 A | 3/1993 |
| FR | 2 831 320 A | 4/2003 |
| GB | 1597415 | 9/1981 |
| WO | WO 2005/031937 A1 | 4/2005 |

\* cited by examiner

*Primary Examiner*—Hae Moon Hyeon
(74) *Attorney, Agent, or Firm*—Jaquez & Associates; Martin J. Jaquez; Alessandro Steiafl (57) ABSTRACT

An electrical coupling bar is described. The coupling bar includes an electrically insulating support with two parallel grooves and metallic strips engaged in the grooves. The metallic strips project out of the grooves with opposite interior faces delimiting a free engagement space. The coupling bar further includes metallic strip protection means covering the other faces of the metallic strips.

6 Claims, 8 Drawing Sheets

ELECTRICAL CONNECTION BAR AND ADAPTED CONNECTION DEVICE

CROSS REFERENCE TO RELATED APPLICATIONS

The present application is the US national stage of PCT Application PCT/FR2004/002420 filed on Sep. 24, 2004 which in turn claims priority to French patent application FR 0311212 filed on Sep. 24, 2003.

FIELD

The present invention relates to the technical field of electrical appliances, for example of the modular type or another type, and also to the field of electrical cabinets in which such electrical appliances are utilised.

More particularly, the present invention concerns electrical cabinets that are intended, for example, to contain racks or other electrical subassemblies which are utilised, for example, in telecommunications.

BACKGROUND

It is often essential to feed electrical subassemblies disposed in an electrical cabinet via a circuit-breaker, in order to protect said subassemblies. The addition of circuit-breakers to these cabinets is often problematic, due to the space requirement which is associated, in particular, with the power supply and the provision of electrical connecting wires.

SUMMARY

The object of the present invention is to eliminate these drawbacks and to bring about the feeding of electrical appliances via protection systems of the circuit-breaker type by facilitating the installation of said systems and by not increasing the space requirement associated with the use of said systems.

The objects assigned to the present invention are achieved with the aid of an electrical coupling bar including:
  an electrically insulating support exhibiting two parallel grooves, a metallic strip engaged in each groove, the metallic strips projecting out of the grooves and exhibiting interior faces opposite one another, delimiting between them a free engagement space for a connecting device, said free engagement space being devoid of any element or of any part or extremity of said support,
  and protecting means covering the, other faces of the metallic strips.

Such a coupling bar has a reduced space requirement and can be easily fastened to a support of the type constituted by walls of an electrical cabinet.

The metallic strips are not directly accessible and so enable accidents to be avoided in the course of interventions in the vicinity of the coupling bar.

In addition, the manufacture of such a coupling bar is easy to implement and inexpensive.

The length of such a coupling bar can be adapted to the requirement by cutting it to the lengths necessary in the given applications.

Such a coupling bar may, moreover, be used with alternating currents or direct currents.

According to an exemplary embodiment, the protecting means and the support are produced from a single piece. The number of parts contained in such a coupling bar is therefore limited.

According to an exemplary embodiment, the metallic strips are inserted into the support. Assembly is realised in this way with a limited number of operations.

According to another exemplary embodiment, the support is obtained by moulding of the metallic strips from a casting. The positioning tolerances of the metallic strips can then be reduced.

According to an exemplary embodiment, the support is realised with a material having a shape and a rigidity enabling the metallic strips to be immobilised.

Therefore no additional fastening means is needed.

According to an exemplary embodiment, the support includes a fastening component. This latter facilitates the mounting and the fastening of the coupling bar, for example in an electrical cabinet.

The fastening component is, for example, a projecting part approximately perpendicular to the interior faces of the metallic strips. This facilitates fastening on a wall parallel to said projecting part.

The present invention also concerns an electrical cabinet equipped with at least one electrical coupling bar as described above.

The present invention also concerns a connecting device intended to be engaged in a coupling bar exhibiting two metallic strips mounted in a support and delimiting between them a free engagement space, said device including a casing realised with an electrically insulating material and forming a housing provided with two input terminals for the connection of an electrical appliance of the circuit-breaker type, two connecting lugs projecting out of the casing, ensuring mechanical maintenance and the electrical link with the metallic strips after their introduction into the free engagement space, the electrical link being realised with metallic parts which are joined respectively onto a face of one connecting lug and onto an opposite face of the other connecting lug, each connecting lug being capable of establishing an electrical link with a specific metallic strip, the casing being also provided with two power-supply terminals incorporating the electrical appliance into the power-supply circuit when a load or another appliance is connected to the power-supply terminals.

In this way it is possible to branch existing modular electrical appliances to the coupling bar via this connecting device, and to do this without adaptation.

According to an exemplary embodiment, the connecting lugs extend in a median extension plane of the housing. Such a configuration enables the positioning of the housing—and consequently of the electrical appliance which comes to be engaged in it—to be optimised in relation to the coupling bar and/or in relation to the electrical subassemblies mounted in an electrical cabinet.

BRIEF DESCRIPTION OF THE DRAWINGS

Other characteristics and advantages will also become apparent from the detailed description provided below with reference to the drawings which are given by way of illustrative examples and in which.

DESCRIPTION OF EXAMPLE EMBODIMENTS

Figure 1:
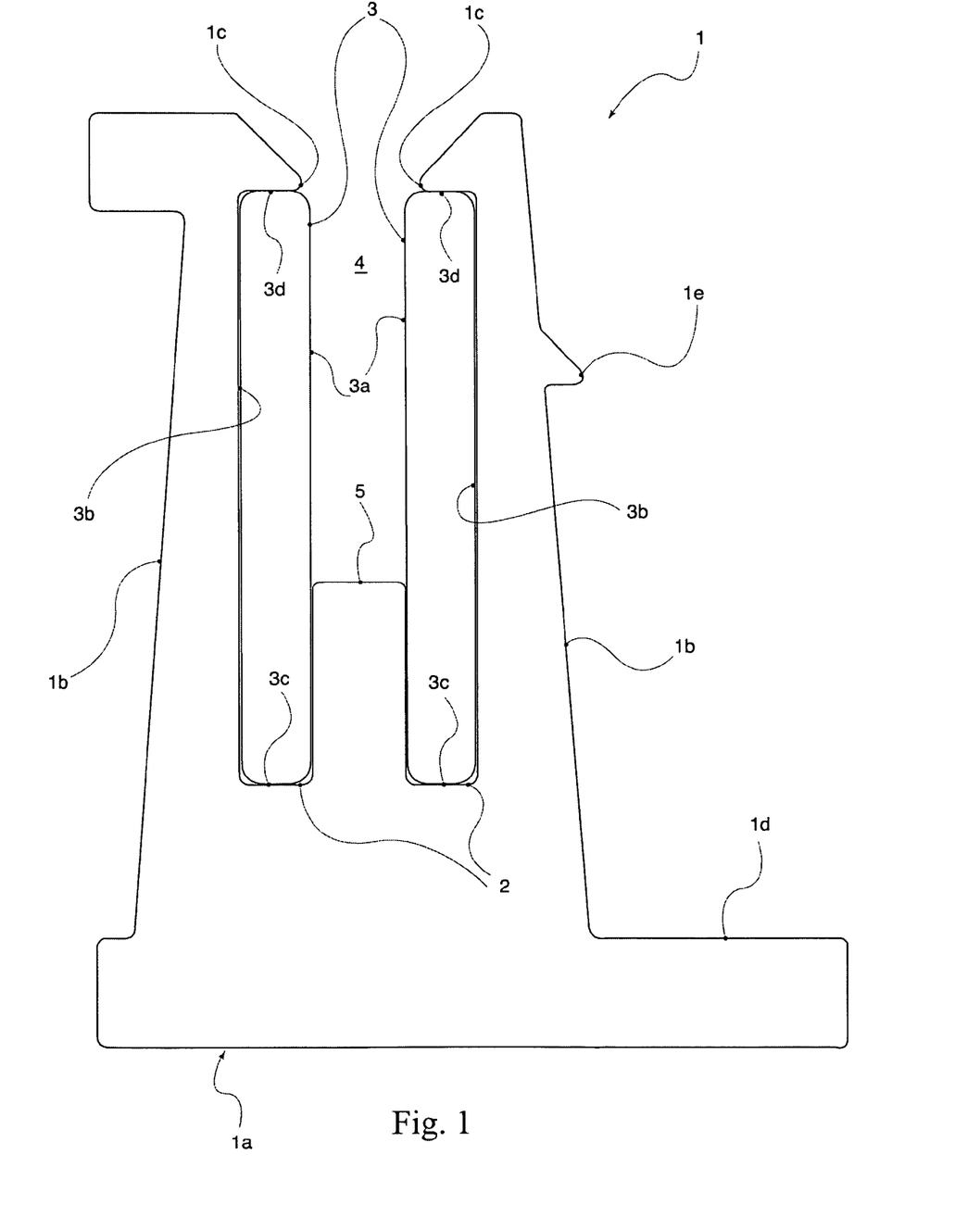
FIG. 1 is a view in transverse section of an exemplary embodiment of a coupling bar according to the invention.

The invention concerns an electrical coupling bar (1), represented for example in FIG. 1, including an electrically insulating support (1a) and exhibiting two parallel grooves (2).

A metallic strip (3) is engaged in each groove (2). The metallic strips (3) serve to realise electrical links and are produced from copper, for example. The metallic strips (3) project out of the grooves (2) and exhibit interior faces (3a) opposite one another, delimiting between them a free engagement space (4).

The free engagement space (4) is devoid of any element or of any part or extremity of the support. The space that is delimited in part by the interior faces (3a) is therefore entirely free and accessible for electrical-connection means and/or maintenance means. It is advantageous that the means that are utilised in order to establish an electrical link with the strips (3) are also utilised for mechanical maintenance on the coupling bar (1).

Means for electrical connection may in this way be engaged in the free engagement space (4). The coupling bar (1) likewise includes protecting means covering the other faces of the metallic strips (3). It is a question of the exterior faces (3b), the lower faces (3c) and the upper faces (3d). In this way, metallic strips (3) are obtained that are inaccessible outside the free engagement space (4).

The parallel grooves (2) are separated by a central rib (5), defining the spacing of the metallic strips (3) which are immobilised in the support (1a), more particularly in the parallel grooves (2).

According to an exemplary embodiment, the protecting means and the support (1a) are produced from a single piece. The support (1a) therefore exhibits rising faces (1b) terminated by upper edges (1c) covering the upper faces (3d) and the exterior faces (3b). Only the interior faces (3a) opposite one another and projecting out of the parallel grooves (2) remain accessible inside the engagement space (4). The metallic strips (3) are therefore not accessible in the coupling bar (1) in normal use.

In order not to hamper the engagement of a connecting terminal in the coupling bar, the upper edges (1c) cover the upper faces (3d) over an approximately equal width. In this way a good mechanical maintenance of the metallic strips (3) is obtained without creating an edge extending into the free engagement space (4). The risk of direct accidental access to the metallic strips (3) is also reduced for the user.

The metallic strips (3) are, for example, inserted into the support (1a). The insertion is, for example, a force fit, enabling the metallic strips (3) to be immobilised in the support (1a). The latter is produced from, for example, thermosetting or thermoplastic plastic.

According to another exemplary embodiment, the support (1a) is obtained by moulding of the metallic strips (3) from a casting. The support (1a) is then realised with a material having a shape and rigidity enabling the metallic strips (3) to be immobilised.

The support (1a) also includes a fastening component (1d) which enables the coupling bar (1) to be fastened to a base of the electrical-cabinet type. The fastening component (1d) is, for example, a projecting part approximately perpendicular to the interior faces (3a) of the metallic strips (3). The coupling bar (1) is, for example, fastened within an electrical cabinet (6).

The present invention also concerns a connecting device (7), represented for example in FIGS. 2, 4, 5 and 6, which is intended to be engaged in the coupling bar (1) described above. Engagement is effected in the free engagement space (4) in a direction approximately orthogonal to the longitudinal direction of extension of the metallic strips (3). Maintenance of the connecting device (7) is obtained by virtue of the friction between the interior faces (3a) and the corresponding parts of the connecting device.

The connecting device (7) includes a casing (8) which is realised with an electrically insulating material and which forms a housing (9) for an electrical appliance (10) of the circuit-breaker type.

The connecting device (7) includes two connecting lugs (11) and (12) projecting out of the casing (8) and ensuring mechanical maintenance and the electrical link with the metallic strips (3). The connecting lugs (11) and (12) are therefore intended to be engaged in the free engagement space (4) of the coupling bar (1). The electrical link is realised with metallic parts (13) which are joined respectively onto a face of one connecting lug (12) and onto an opposite face of the other connecting lug (11). The metallic parts (13) are therefore disposed on a single face of each connecting lug (11) or (12). In this way each connecting lug (11) or (12) is capable of establishing an electrical link with a corresponding metallic strip (3) from the time of its introduction into the free engagement space (4).

Figure 2:
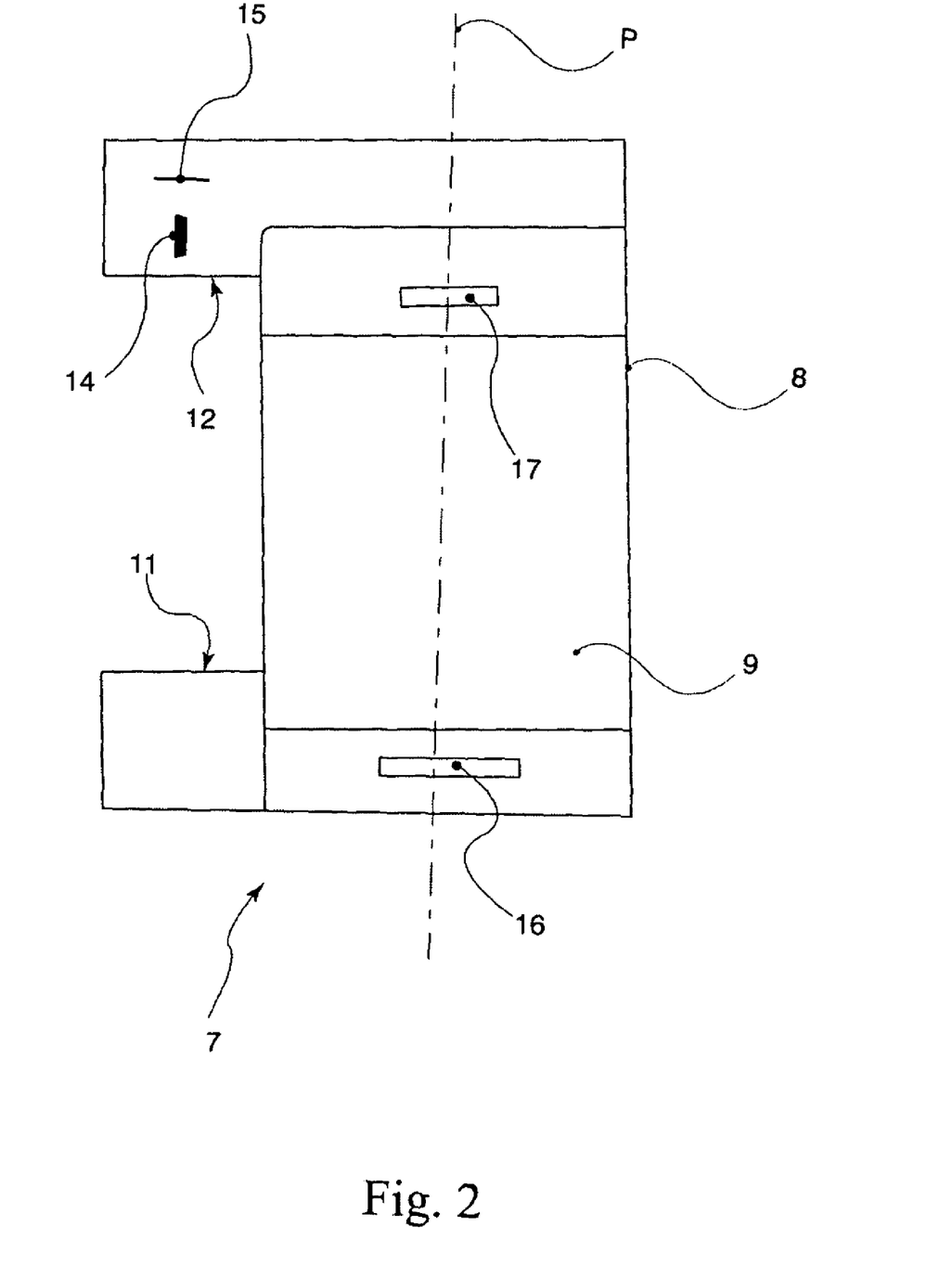
FIG. 2 is an exemplary embodiment of a connecting device according to the invention.
Figure 3:
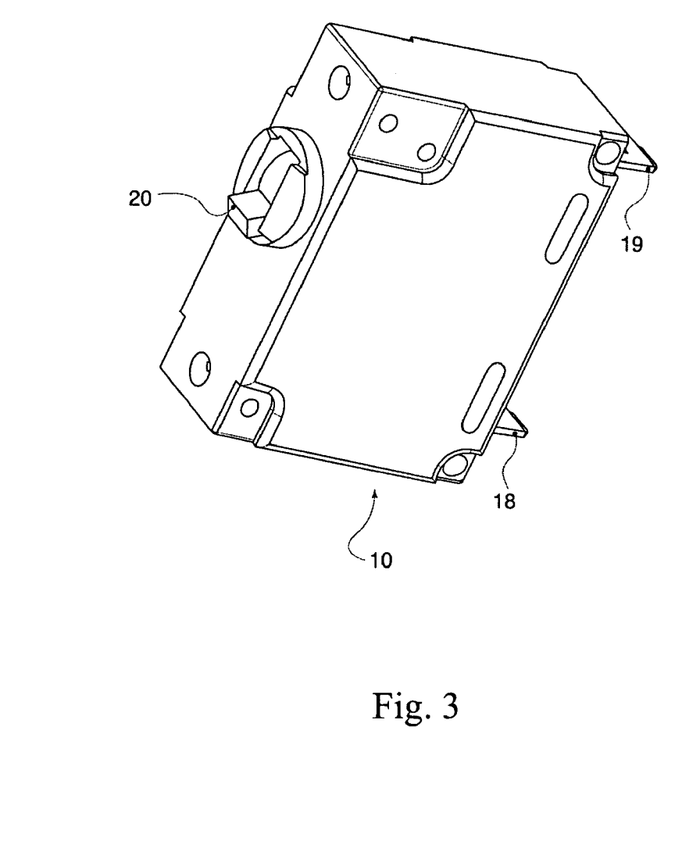
FIG. 3 is an exemplary embodiment of an electrical appliance intended to be inserted into the connecting device of FIG. 2.
Figure 4:
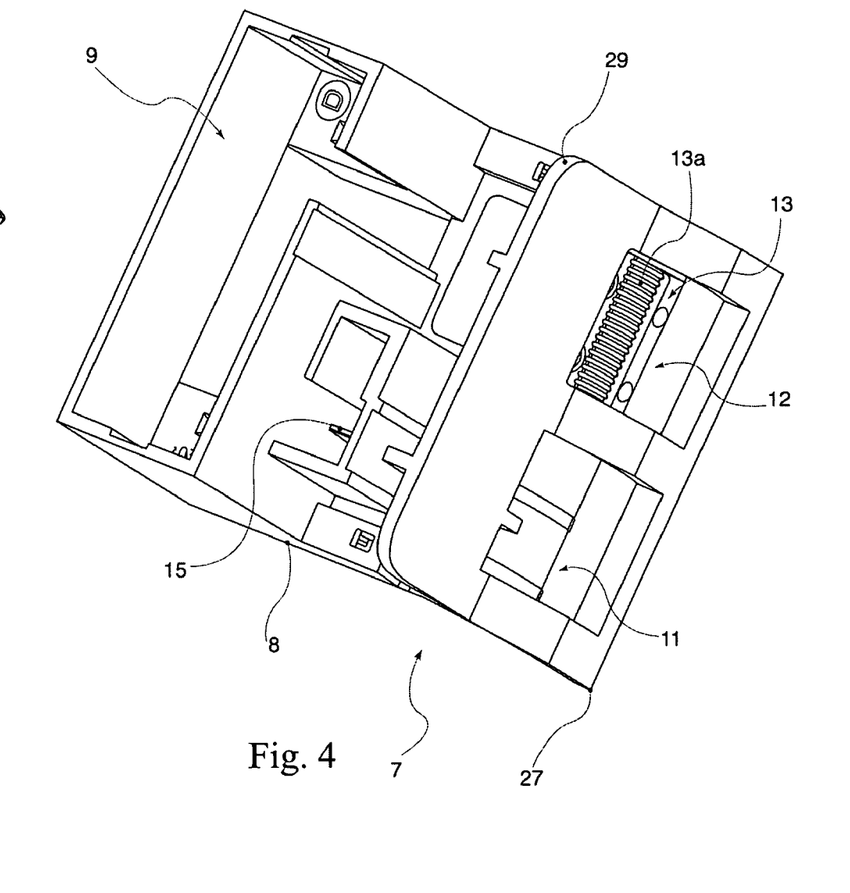
FIG. 4 is another exemplary embodiment of the connecting device according to the invention.
Figure 5:
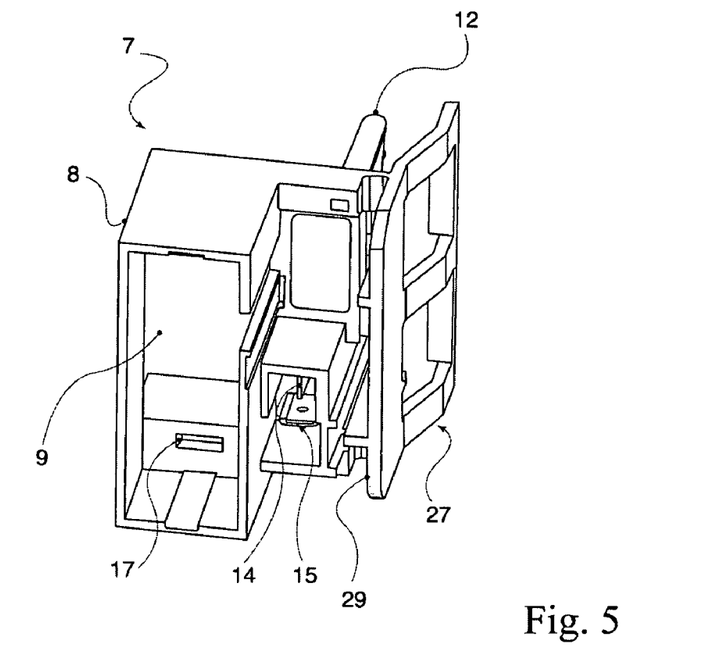
FIGS. 5 and 6 are complementary views of the connecting device of FIG. 4.
Figure 6:
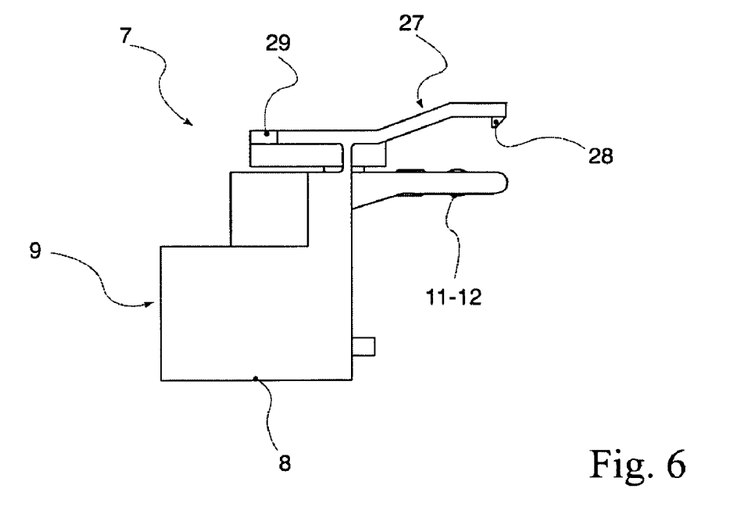
Figure 7:
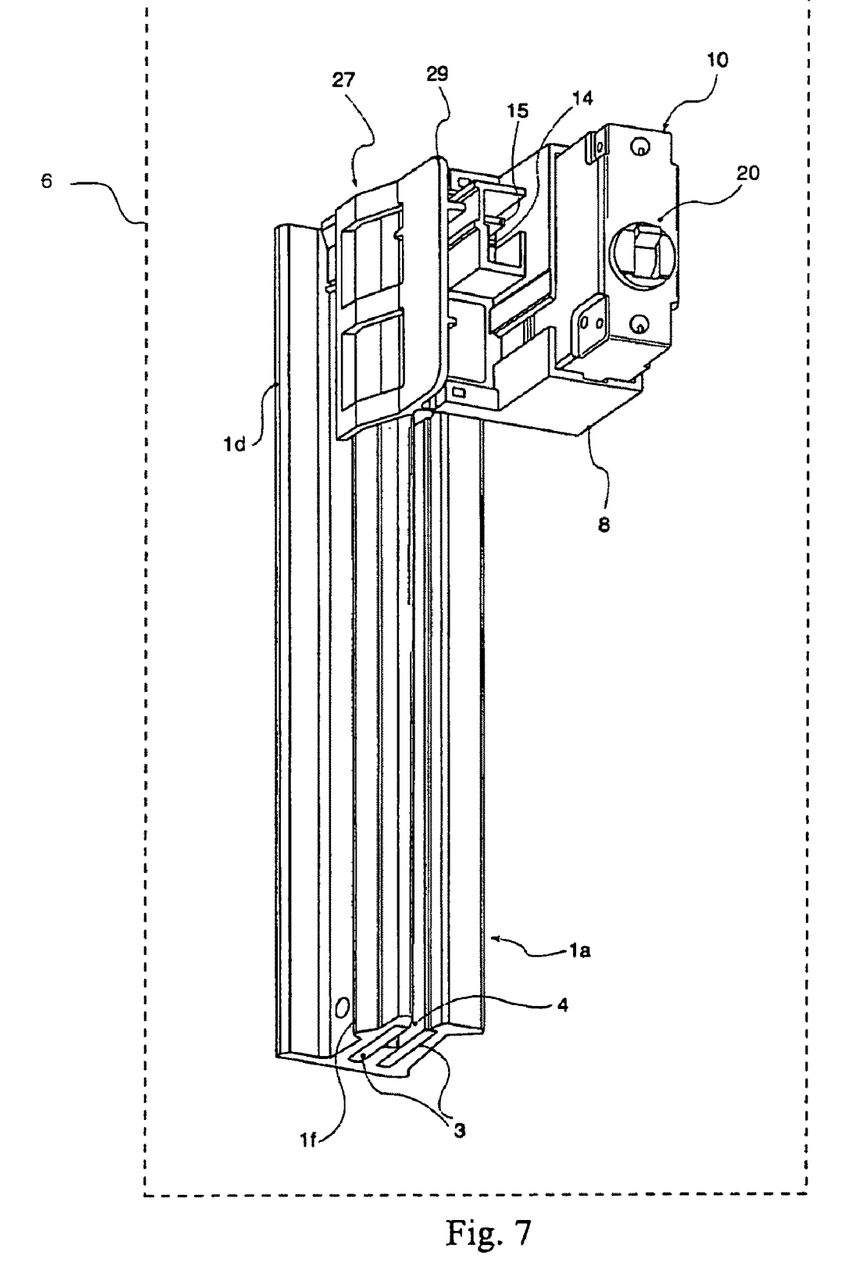
FIG. 7 is an example of the mounting of the connecting device according to the invention on the coupling bar according to the invention, FIGS. 8 and 9 each represent a face of an exemplary embodiment of a power-supply device of the coupling bar according to the invention.

The casing (8) is also provided with two power-supply terminals (14) and (15) integrating the electrical appliance (10) into the power-supply circuit when a load or another appliance having to be protected is connected to said power-supply terminals (14, 15). Input terminals (16, 17) are provided at the bottom of the housing (9) for the connection of the electrical appliance (10) subsequent to its positioning in said housing. In this way the power-supply terminal (14) is directly linked to the metallic part (13) which is intended to come into contact with one of the metallic strips (3), whereas the power-supply terminal (15) is directly linked to the input connecting terminal (17). The input connecting terminal (16) is directly linked to the other metallic part (13) which is intended to come into contact with the other metallic strip (3). When the electrical appliance (10), in the given case a circuit-breaker, is inserted with plug-in terminals (18) and (19) into the corresponding input terminals (17) and (16), an electrical power supply is obtained at the power-supply terminals (14) and (15) integrating said electrical appliance (10) into the electrical power-supply circuit. In this way the branching at the power-supply terminals (14) and (15) is secured by the electrical appliance (10), in the given case a circuit-breaker (10). This latter is advantageously provided with a resetting lever (20).

The connecting lugs (11) and (12) advantageously extend within an offset extension plane which is parallel to a median extension plane (P) of the housing (9). This enables the positioning of the electrical appliance (10) and of the connecting device (7) to be optimised, and at the same time enables the space requirement of said subassembly in an electrical cabinet (6) to be reduced. Accessibility to the power-supply terminals (14) and (15) is also facilitated. The power supply may also be positioned at any place whatsoever on the coupling bar (1).

Figure 8:
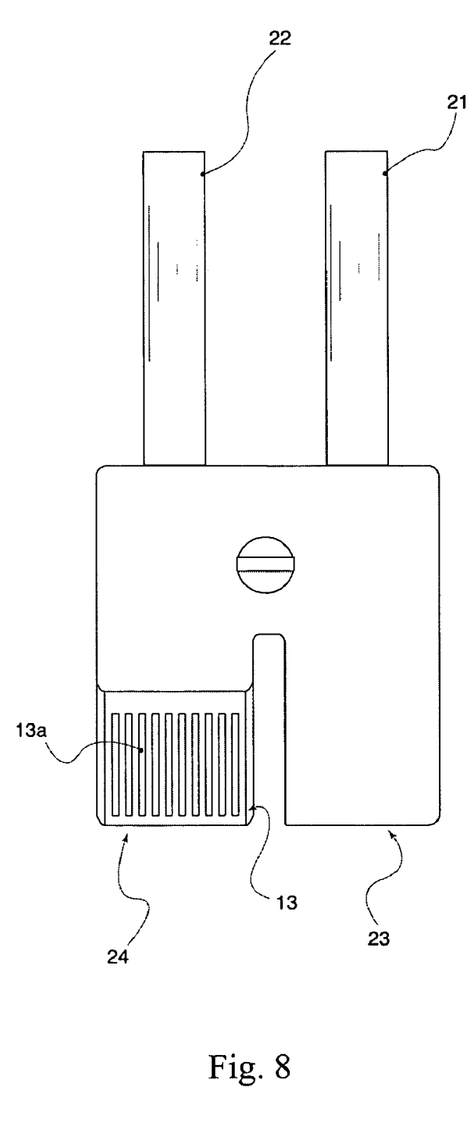
Figure 9:
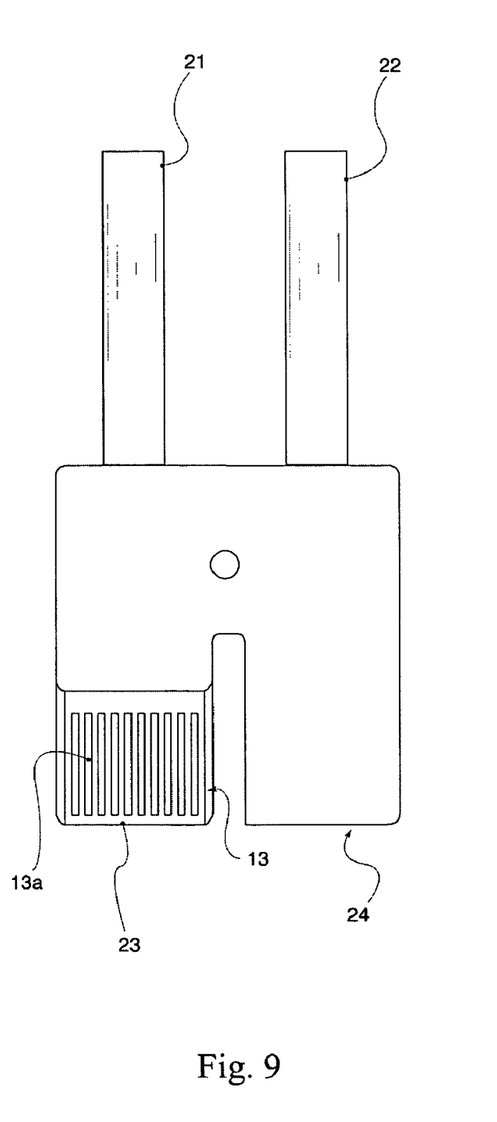

The electrical coupling bar (1) is fed electrically via a power-supply device, represented for example in FIG. 8, 9, 10 or 11. FIGS. 8 and 9 represent, respectively, a front view and a rear view of such a power-supply device. This latter comprises two power-supply wires (21, 22), each of which is linked to a power-supply lug (23, 24) which is created from an electrically insulating support. Each power-supply lug (23, 24) is provided on one of its faces with a joined-on metallic part (13), enabling the electrical link to be established. This metallic part (13) is advantageously provided with parallel lamellae (13a), the cambered shape of which enables a mechanically stable and intimate engagement to be ensured between the metallic strips (3). The thickness of the power-supply lugs (23, 24), including the metallic parts (13), is therefore perfectly adapted to the clearance of the metallic strips (3).

Figure 10:
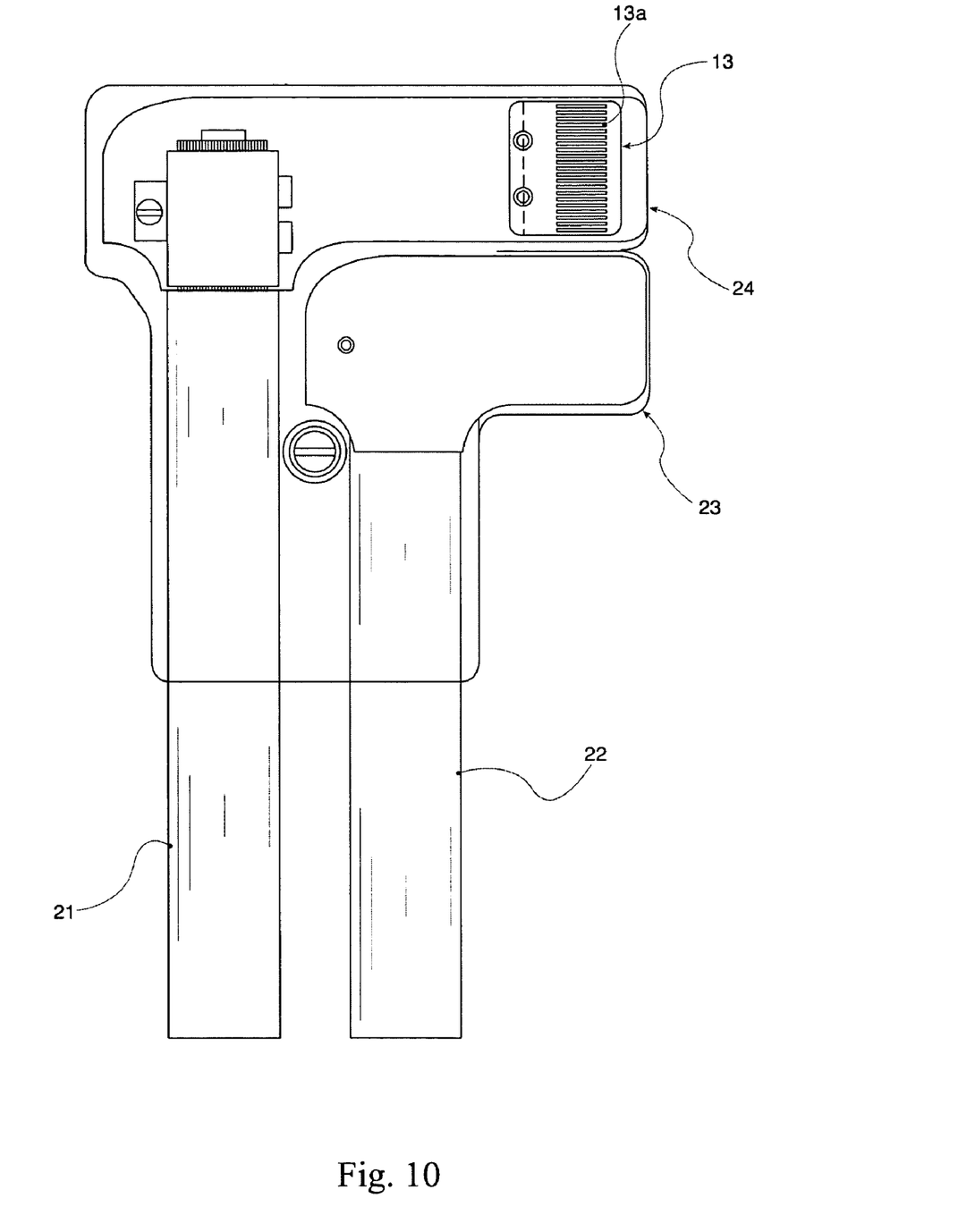
FIG. 10 is another exemplary embodiment of the power supply of the coupling bar according to the invention.

Another example of a power-supply device is represented in FIG. 10. In this exemplary embodiment the power-supply lugs (23, 24) extend approximately orthogonally to the direction of introduction of the linking wires (21, 22) into said device. The wires 21, 22 are linked to the metallic parts (13) via any known means.

The metallic parts (13) described below are also suitable for the connecting device (7) described previously, represented for example in FIG. 4.

Figure 11:
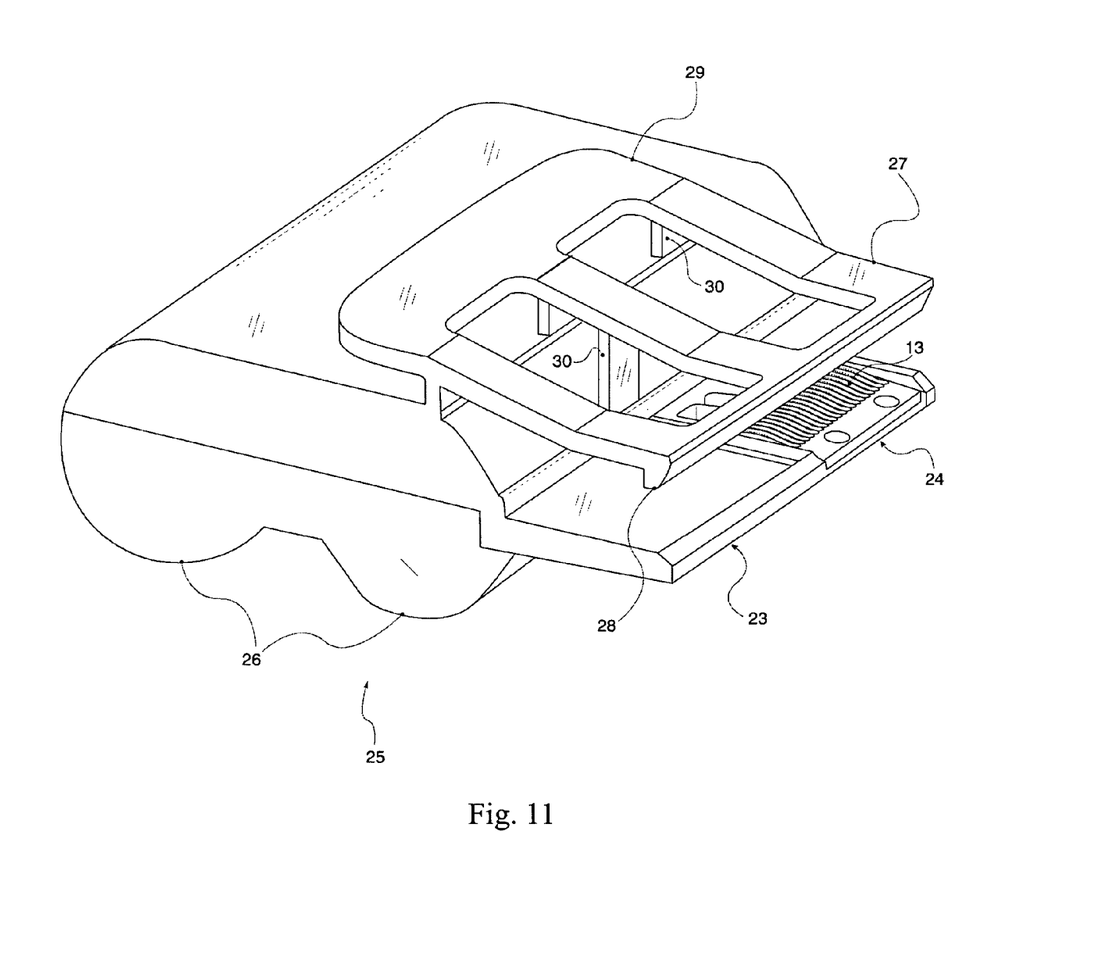
FIG. 11 is a complementary exemplary embodiment of the power-supply device of the coupling bar according to the invention.

FIG. 11 represents an embodiment variant of a power-supply device which exhibits an engagement fitting (25) in which two routing zones (26) of the cables (21, 22) enable the connection with corresponding metallic parts (13) to be realised.

The fitting (25) is provided with a blocking arm (27), the extremity of which, overhanging the power-supply lugs (23, 24), is provided with a clip (28). This latter is intended to be engaged behind at least one projection (1e) provided on a rising face (1b) of the support (1a). According to the example represented in FIG. 11, the power-supply lugs 23 and 24 are produced in a single piece. Linking contacts (30) enable the blocking arm (27) to be linked to the fitting (25) and enable an elastic deformation to be ensured in order to enable the engagement of the clip (28) behind the projection (1e). A pressure zone (29), provided on the blocking arm (27) at the opposite end of the clip (28), enables the disengagement of the fitting (25) from the coupling bar (1) to be facilitated. By action on the pressure zone (29), the clip (28) is released from the projection (1e).

This latter may also be replaced by a rib (10). The blocking arm (27) therefore enables a stable fastening to the coupling bar (1) of the power-supply lugs (23) and (24) to be guaranteed and, if need be, enables a definite polarity to be identified for the power supply of the electrical metallic strips (3).

The connecting device according to the invention may also be provided with an indicator means enabling the energising of said connecting device to be identified. This indicator means may be constituted by light-emitting diodes.

In this way the connecting device (7) and the power-supply means may be mounted at any point on the coupling bar (1).

Great flexibility in the layout of electrical appliances (10) in an electrical cabinet (6) is obtained in this way.

According to the examples represented in FIGS. 4, 5, 6 and 7, the connecting device (7) is also provided with a blocking arm (27), the description of which given above for the power-supply device is transposable in all points. The mountings of the connecting device (7) and of the power-supply device on the coupling bar (1) are therefore identical. A pressure on the pressure zone (29) suffices in order to release the clip (28) (FIG. 6) from the connecting projection (7) of the coupling bar (1).

The invention claimed is:

1. A connecting device intended to be engaged in a coupling bar which comprises a support and two metallic strips mounted in the support and in which a free engagement space is delimited between the metallic strips, said connecting device
    comprising a casing, made from an electrically insulating material and
    forming a housing provided with two input terminals for the connection of an electrical appliance of the circuit-breaker type,
wherein:
    two connecting lugs project out of the casing, ensuring mechanical maintenance and an electrical link with the metallic strips after introduction of the two connecting lugs into the free engagement space,
    the electrical link is made from metallic parts joined respectively onto a face of one connecting lug and onto an opposite face of the other connecting lug,
    each connecting lug is capable of establishing the electrical link with the corresponding metallic strip, and
    the casing is also provided with two power-supply terminals integrating the electrical appliance into the power-supply circuit when a load or another appliance is connected to the power-supply terminals.

2. The connecting device according to claim 1, including a means for indicating the energising of the metallic strips.

3. A protecting device comprising the connecting device according to claim 1 and an electrical circuit-breaker.

4. A power supply device intended to be engaged in a coupling bar which comprises two metallic strips mounted in a support and in which a free engagement space is delimited between the metallic strips, said power supply device comprising:
    a casing, made from an electrically insulating material and
    two power supply wires, each of which is linked to a connecting lug,
wherein:
    said connecting lugs project out of the casing, ensuring mechanical maintenance and an electrical link with the metallic strips after introduction of the connecting lugs into the free engagement space,
    the electrical link is made from metallic parts joined respectively onto a face of one connecting lug and onto an opposite face of the other connecting lug, and
    each connecting lug is capable of establishing the electrical link with the corresponding metallic strip.

5. The power supply device according to claim 4, wherein the connecting lugs extend approximately orthogonally to the direction of introduction of the power supply wires into said device.

6. The power supply device according to claim 5, further comprising an engagement fitting in which two routing zones of the power supply wires are capable of establishing a connection with the corresponding metallic parts.

* * * * *